H. A. TOLLES AND G. H. ERNSBARGER.
METHOD AND APPARATUS FOR PRODUCING MOTION PICTURES.
APPLICATION FILED AUG. 30, 1916.
1,308,207.
Patented July 1, 1919.
3 SHEETS—SHEET 1.
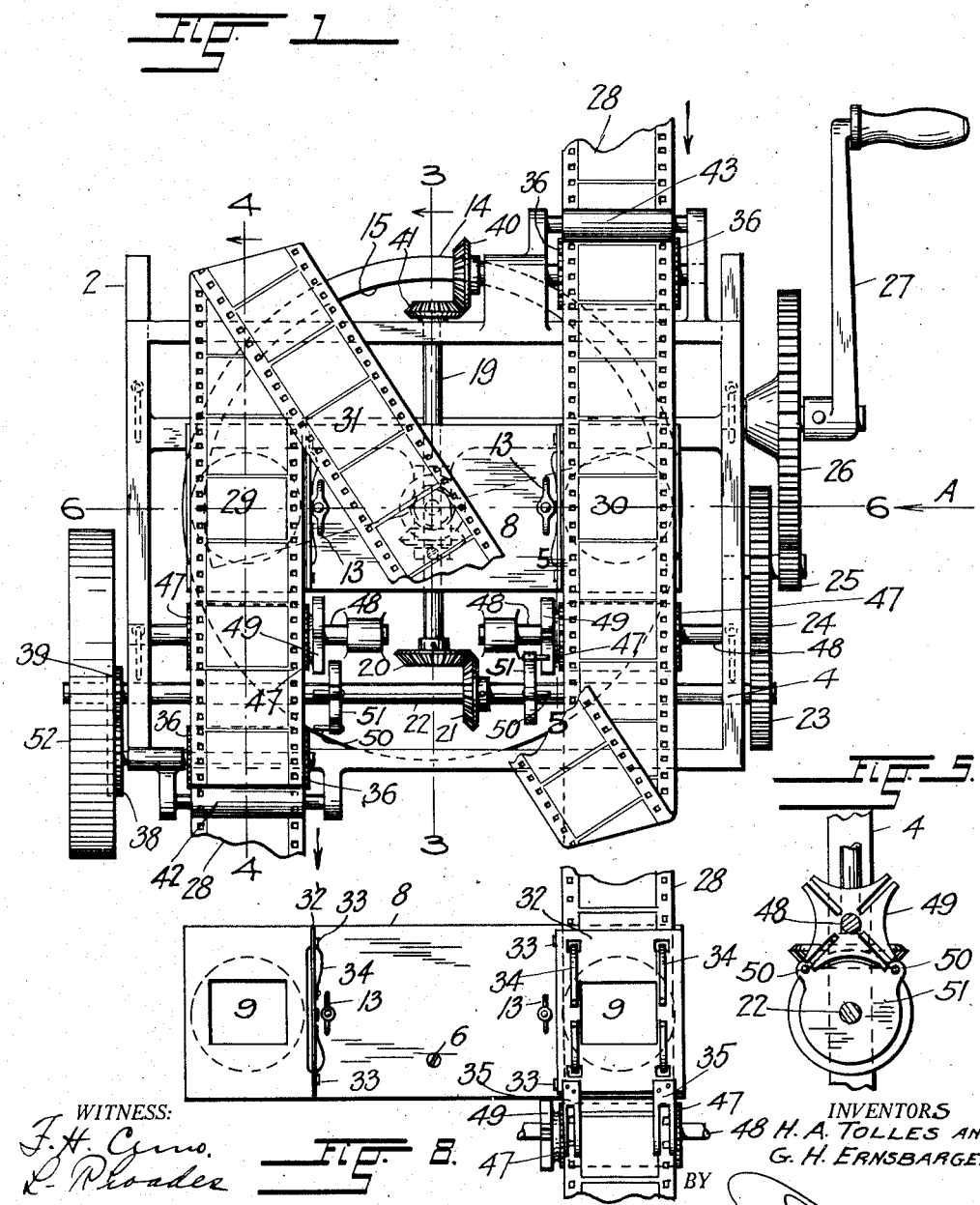
WITNESSES:
INVENTORS
H. A. TOLLES AND
G. H. ERNSBARGER.
BY
ATTORNEY.

H. A. TOLLES AND G. H. ERNSBARGER.
METHOD AND APPARATUS FOR PRODUCING MOTION PICTURES.
APPLICATION FILED AUG. 30, 1916.
1,308,207.
Patented July 1, 1919.
3 SHEETS—SHEET 2.
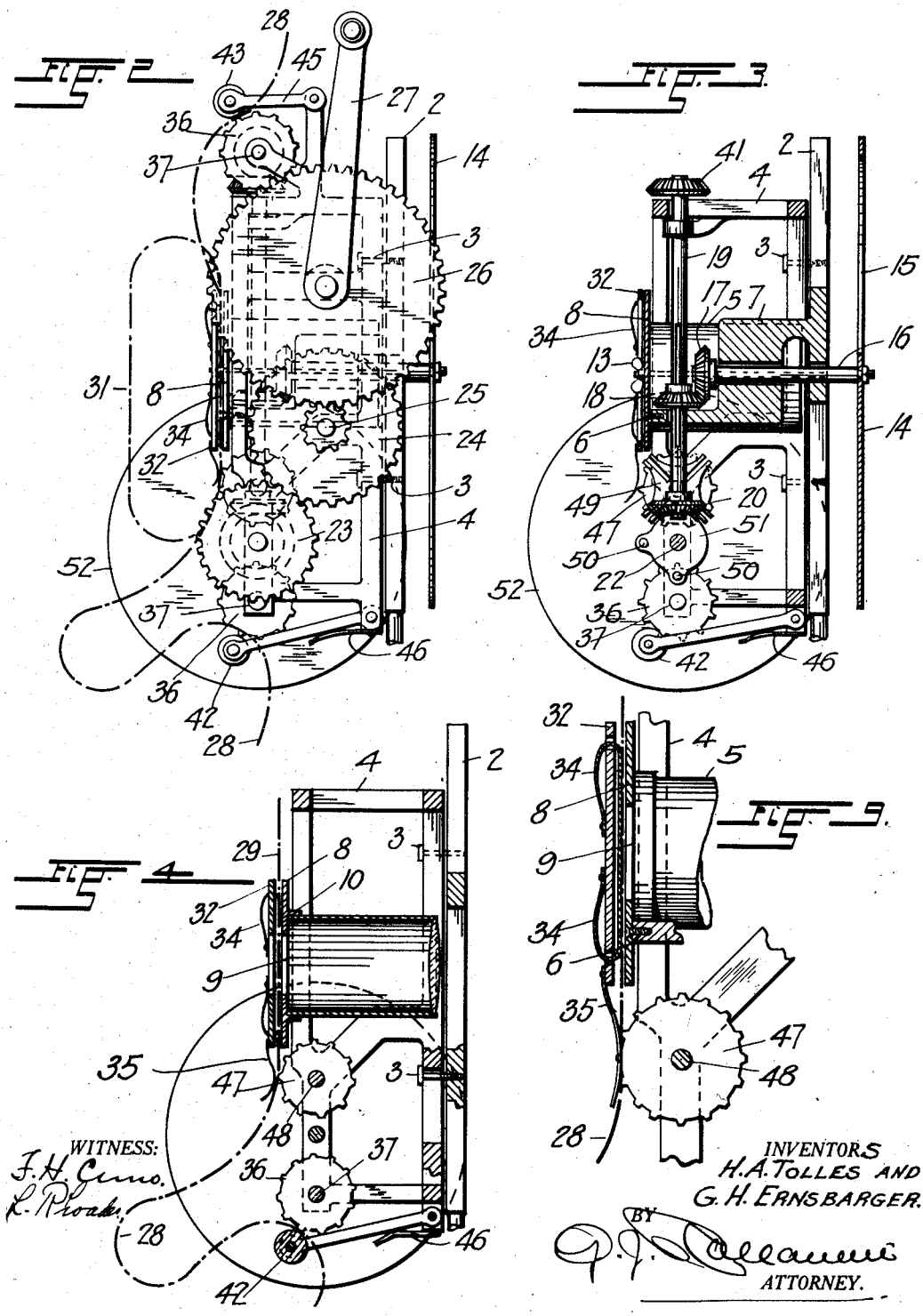
INVENTORS
H. A. TOLLES AND
G. H. ERNSBARGER.
ATTORNEY.

H. A. TOLLES AND G. H. ERNSBARGER.
METHOD AND APPARATUS FOR PRODUCING MOTION PICTURES.
APPLICATION FILED AUG. 30, 1916.
1,308,207.
Patented July 1, 1919.
3 SHEETS—SHEET 3.
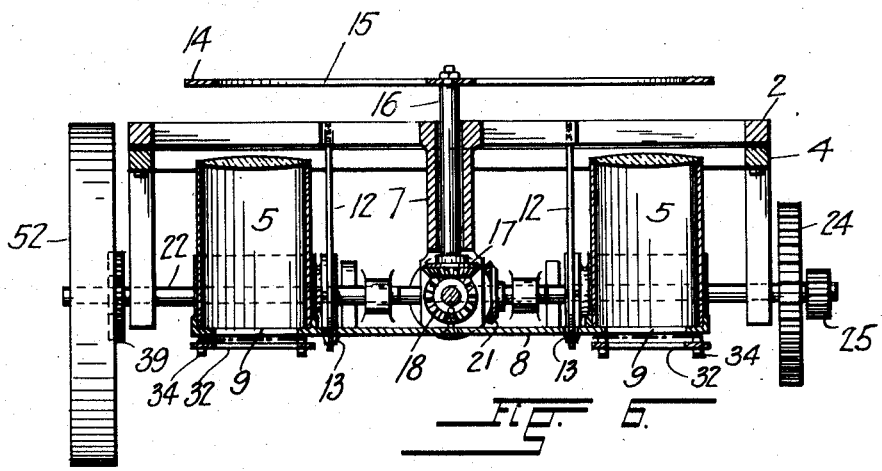
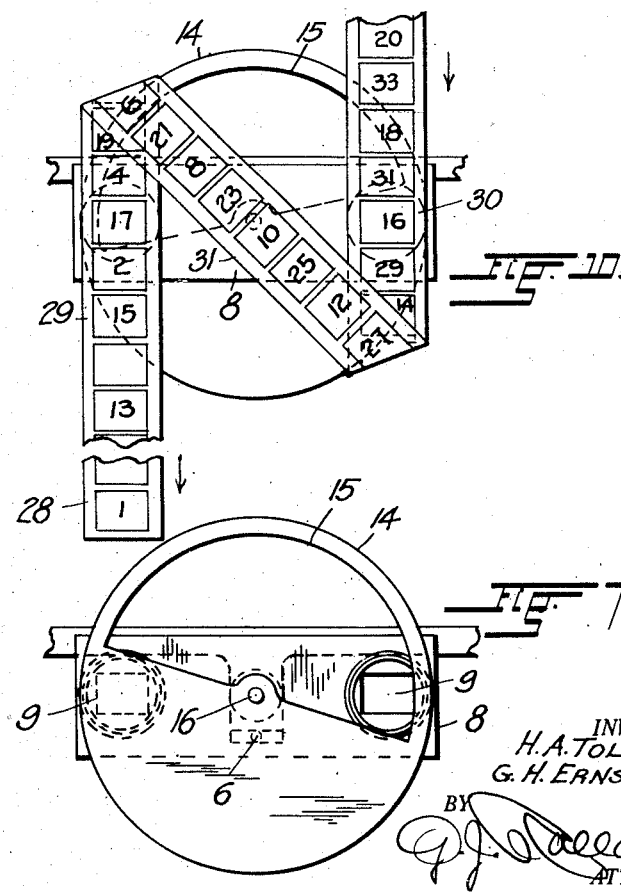
WITNESS:
INVENTORS
H. A. TOLLES AND
G. H. ERNSBARGER.
BY
ATTORNEY.

UNITED STATES PATENT OFFICE.

HARRY A. TOLLES AND GEORGE H. ERNSBARGER, OF FLORENCE, COLORADO, ASSIGNORS OF ONE-HALF TO JOSEPH D. BLUNT AND DELBERT A. HESSICK, BOTH OF FLORENCE, COLORADO.

METHOD AND APPARATUS FOR PRODUCING MOTION-PICTURES.

1,308,207.      Specification of Letters Patent.      Patented July 1, 1919.

Application filed August 30, 1916. Serial No. 117,715.

*To all whom it may concern:*

Be it known that we, HARRY A. TOLLES and GEORGE H. ERNSBARGER, residing at Florence, in the county of Fremont and State of Colorado, citizens of the United States, have invented certain new and useful Improvements in Methods and Apparatus for Producing Motion-Pictures, of which the following is a specification.

Our invention relates to a novel method of producing motion pictures, and its primary object resides in producing by the operation of a suitably constructed instrument, a motion picture entirely free from the flicker which is characteristic of motion pictures projected by instruments of ordinary construction.

Another object of our invention is to produce a stereographic motion picture having the appearance of relief and solidity belonging to ordinary vision, and still another object of the invention resides in the provision of an instrument which may be used both for the production and projection of motion pictures of the character mentioned, which permits of the use of ray filters for the production of colored motion pictures through the medium of a nontinted positive film, and which in comparison with other devices of the same class, is of very simple construction.

We obtain these objects by the use of a film feeding- and shutter-mechanism which causes two film-sections to be exposed alternately to the light rays passing through two matched lens-combinations which for convenience in description, will hereinafter be referred to as the lenses of the instrument.

When the instrument is used to produce a series of sequential photographic pictures upon two film sections, the two lenses are focused upon the object to be photographed, while in the use of the apparatus in projecting motion-pictures the lenses are adjusted so that their convergent axial rays intersect at a point of the screen upon which the pictures are projected.

The film feeding- and shutter-elements of the invention coöperate to alternately cover the two lenses during determinate periods, open both lenses simultaneously during intervals between said periods, and feed the film-sections alternately a predetermined distance during the periods the lenses behind which the film-sections are disposed, are covered by the shutter-element.

It will be seen that in projecting a motion-picture, thus produced by means of the instrument in its kinetographic character, through the medium of a projecting instrument of similar construction, there is a continuous uninterrupted projection of light upon the screen and the series of sequential pictures blend in consequence into each other without the momentary interruptions caused by the movement of the shutter past the lens in the single lens projecting machine at present in common use.

It follows that the flicker caused solely by the intermittent obstructions to the light rays passing through the lens, is entirely eliminated and a clear and steady image of the motion picture is thrown on the screen.

The alternate use of two lenses in producing a series of photographic pictures and projecting them upon a screen, furthermore adapts the instrument for the projection of naturally colored pictures from a nontinted film, inasmuch as it permits of the simultaneous use of the two complemental color screens used in modern color photography, and the fact that the pictures produced in the operation of the instrument are taken alternately at different angles through two axially convergent lenses, will cause the projection of the pictures to be of a stereoscopical character.

While in the use of our instrument the pictures may be produced upon two separate film-sections, it is for many reasons preferable that they should be assembled upon one strip of film which is arranged in the apparatus so that different sections thereof register with the two lenses and are alternately fed by intermittent movements imparted to the sections while the respective lenses are covered by the shutter-element.

It will be understood that by producing the consecutive pictures of a sequential series alternately through two separate lens-combinations, their arrangement upon the film-strip will differ from that of the films made by a single lens camera and that a film having this novel arrangement of consecutive pictures is an essential element of the invention.

It will furthermore be understood that the use of the instrument is not limited to two lenses, but that three or four matched lens-combinations may be employed to coöperatively produce a series of negatives of one moving object and project the motion picture thereof upon the screen.

Inasmuch as variations of the kind above referred to may be resorted to without in any way departing from the spirit of our invention, we have limited the following description to an instrument equipped with two lenses for the production and projection of a series of pictures on one continuous film, and with this in view we have shown an embodiment of our invention in the accompanying drawings in the various views of which like parts are similarly designated, and in which Figure 1 is a rear elevation of the operating mechanism of the instrument, a portion of the film having been broken away to show parts of the mechanism covered thereby, Fig. 2, a side elevation of the mechanism, looking in the direction of the arrow A, Fig. 1, Fig. 3, a section along the line 3—3, Fig. 1, Fig. 4, a section taken along the line 4—4, Fig. 1, Fig. 5, a fragmentary section along the line 5—5, Fig. 1, Fig. 6, a horizontal section along the line 6—6, Fig. 1, Fig. 7, a face view of the shutter and lens-holder included in the instrument, Fig. 8 a detail face view of the flexible lens-holder and the means connected therewith for holding the film in register with the openings of the lenses, Fig. 9 a section of the film holding appliance drawn to an enlarged scale, and Fig. 10, a detail view of the film used in connection with the instrument showing its operative position relative to the shutter and the lens-holder of the same.

The apparatus in the form and condition shown in the drawings is adapted for use in projecting upon a screen, a motion-picture from a series of sequential pictures on a continuous strip of film, and the construction and operation of our invention will be described as such in the course of the following description.

The only changes required to adapt the apparatus for use in producing the series of pictures upon the film, are to inclose the mechanism shown in the drawings in a light-tight box and to substitute camera lenses for the projecting lenses.

Referring to the drawings by numerical reference characters, 2 designates a standard which forms part of a basal structure of suitable construction by means of which the instrument is mounted upon a stationary support.

Adjustably secured to the standard by means of bolts or screws 3, is a skeleton frame 4 upon which the operating mechanism of the instrument is assembled.

The lens-tubes 5 in which the two matched lenses-combinations used in the operation of the instrument, are inclosed, are fixed upon a holder which by means of a screw 6 is at a point intermediate of its extremities, rigidly secured upon the end of a rearwardly projecting bracket 7 formed integrally with the standard 2.

The holder consists of a plate 8 of flexible material which has at equal distances from and at opposite sides of a transverse line passing through the point at which it is fastened to the bracket, apertures 9 which are concentric to circular sockets 10 formed upon the face of the plate to receive and secure the lens-tubes 5.

Rods 12 fixed on the standard in parallel relation to each other, extend through slots in the lens-plate 8 at opposite sides of the central point at which it is secured upon the bracket, and the end-portions of the rods are threaded for the application of adjusting nuts 13 which bear upon the rear surface of the plate.

It will be seen that by adjustment of these nuts upon the rods, the plate may be flexed at opposite sides of its transverse axis to vary the angle of convergence between the axes of the lens-tubes and thereby focus the lenses upon the object to be photographed or upon a point of the screen upon which the motion picture is projected.

A shutter composed of a circular plate 14 provided with a semicircular opening 15, is mounted for rotation about an axis which extends in a plane with and centrally between the axes of the lens apertures.

The shutter is fixed upon the outer end of a shaft 16 which is rotatably fitted in a bore of the bracket 7 and which at its opposite end carries a beveled gear-wheel 17. This gear-wheel meshes with a similar gear 18 on a counter-shaft 19 which is mounted in bearings upon a skeleton frame and which through the intermediary of a pair of beveled gears 20 and 21, is operatively connected with a driving shaft 22 which likewise is mounted for rotation on the frame 4.

A reduction gearing preferably consisting of a series of intermeshing toothed wheels 23, 24, 25 and 26, is provided to impart a rotary motion to the driving shaft by manual rotation of a hand-crank 27.

The film strip which in the drawing is designated in its entirety by the numeral 28, is as usual unwound from a rotary spool and wound upon another similar spool which have not been shown in the drawings.

The strip is arranged relative to the lens-openings of the holder so that two nonconsecutive sections 29 and 30 are placed in parallel relation behind said openings with the connecting section 31 of the film extending diagonally between opposite ends of the parallel sections, in a loop which affords sufficient play to permit of a free feeding motion of the two parallel film sections in one direction.

For clearness of illustration the film-strip has been indicated in Figs. 2, 3, 4, 6 and 9 of the drawings by dash-dot lines.

The sections of the film extending across the openings in the lens-plate, are held in engagement with the rear surface of the plate by means of retaining appliances which also serve to hold the sections in engagement with the sprockets of the intermittently rotating elements of the feed-mechanism hereinafter to be described.

The retaining plates above referred to consist of frames 32 which are hinged upon the lens-plate as at 33 and whose openings register with the lens-apertures in the plate when the frames are parallel therewith.

Each frame carries a pair of springs 34 which bear upon the edges of the film disposed between it and the rear surface of the lens-plate and thereby maintain the film-section in a position at right angles to the axis of the respective lens.

Another pair of springs 35 attached at the lower edge of each frame, engages the respective section of the film to insure its constant engagement with the teeth of the sprockets included in the intermittently operating element of the feeding mechanism hereinafter to be described.

The feeding mechanism hereinabove referred to comprises two continuously rotating elements each composed of a pair of connected sprocket-wheels 36 which mesh with the series of equidistant perforations along the edges of the film-strip.

The pairs of sprockets of the two feeding elements are mounted on parallel shafts 37 supported in bearings at diagonally opposite points of the frame to engage the outer portions of the film sections which extend across the openings of the lens-holder.

The shaft of one of these elements is by means of meshing gear-wheels 38 and 39, operatively connected with the driving shaft 22 and the shaft on which the pair of sprockets of the other element is mounted, is through the intermediary of a pair of beveled gear-wheels 40 and 41 connected with the counter shaft 19.

The gearings by which the two shafts 37 are operatively associated with the driving shaft, are arranged to impart a continuous rotary motion to the two sets of sprocket wheels in the same direction.

The film-strip whose series of perforations mesh with the teeth of the sprocket-wheels, are held in engagement therewith by means of idlers 42 and 43 at the ends of pivoted arms 44 and 45 one of which engages the film by gravity, while the other is forced in contact with the same by a spring 46.

The feeding mechanism includes, furthermore, two intermittently operating elements each consisting of a set of sprockets 47 which engage the series of apertures along the edges of two parallel film-sections at points more adjacent the lens-openings in the plate 8.

The sets of sprocket-wheels 47 are mounted on axially-alined shafts 48 supported in bearings on the skeleton-frame, which shafts also carry four-pointed star wheels 49 through the intermediary of which an intermittent rotary movement is imparted to the sprockets when the hand-crank of the instrument is rotated.

The points of the star wheels are radially grooved as shown in Fig. 5, to receive in the operation of the instrument, laterally projecting cam-pins 50 on disks 51 which are rigidly mounted on the driving shaft.

Each of the disks has two cam-pins set at an angle of ninety degrees with relation to each other and the two disks are arranged on the shaft so that their pins alternately engage the respective star wheels and thereby feed the film-sections engaged by the sprockets with which the star wheels are associated, determinate equal distances at regular intervals.

The gearing which connects the shutter and feed-elements of the mechanism with the driving shaft for synchronous operation, is proportioned and arranged so that the film-sections 30 are fed longitudinally by action of the respective intermittently rotating sprocket-wheels, while the lens-openings across which they extend are obscured by the solid half of the shutter, and so that both sections of the film are stationary during the intervals between the periods during which the lenses are covered, in which both lens-openings are in register with the semi-circular opening of the shutter.

A fly-wheel 52 mounted on the driving-shaft, assists in securing a uniform motion to the operating mechanism hereinbefore described.

Having thus described the mechanical construction of our improved instrument for the production of motion pictures its operation and the advantages and novel results obtained therefrom will be readily understood by those versed in the art to which the invention appertains.

Referring to Fig. 10 of the drawings, the pictures on the film have been numbered consecutively in accordance with their sequence.

In producing the film the object is photographed alternately through the two lenses which in the operation of the shutter-element of the instrument, are covered alternately during equal periods and opened simultaneously only during brief intervals between said periods.

The result is that the sequence of pictures is produced upon the film in two series, one of which is placed on the film strip in advance of the other and the members of which are placed in alternate relation to each other.

To project a film thus produced, it is arranged with relation to the lens-holder of the instrument so that during the instant that both lenses are uncovered in the rotary movement of the shutter, consecutive pictures of the sequence are in register with the two lens-openings, one of said pictures belonging obviously to the even series and the other to the uneven series.

In the operation of the instrument, the constantly rotating elements of the feeding mechanism, move the end-portions of the film lengthwise in the same direction.

The element adjacent the unwinding end of the film produces a slack in the portion of the film between its sprockets and the point at which the film is held upon the lens-plate and the element at the other end of the film takes up the slack produced in the film section by the corresponding intermittent sprocket-wheel.

When during rotary movement of the shutter one of the lenses is covered, the intermittently rotating feed-element at the same side of the instrument is actuated to advance the corresponding section of film a distance equal to the width of two of the picture spaces thereby moving the next member of the series which in the operation is exposed through said lens, in register therewith.

The opposite section of the film remains during this step in the cycle of operations, in a fixed position relative to the other lens, owing to the engagement of the springs on the respective retaining plate with its edges, and the engagement of the teeth of the sprocket-wheels of the respective intermittent feed-element with the apertures along its edges.

When the opening of the shutter registers momentarily with both lenses during the brief interval between the alternating periods of exposure, the consecutive pictures which are in register therewith are simultaneously exposed to blend their images thrown on the screen, before the previously exposed picture is obscured and the next succeeding one is projected.

During the next period in the operation of the shutter, the actions of the feeding mechanism are reversed and the section of the film disposed across the opening of the previously open lens is now drawn longitudinally a distance equal to the width of two of the picture spaces to bring the next picture of the series exposed through the said lens, in register with the corresponding opening in the lens-plate.

It will thus be seen that in the operation of the instrument, consecutive members of the sequence of pictures on the film are alternately exposed through the two lenses during determinate periods and that in the intervals between said periods the lenses are simultaneously uncovered to effect an uninterrupted projection of light-rays upon the screen and blend each new picture into the preceding one.

It will be readily understood without further explanation that the pictures thus projected are produced in the same manner after the instrument has been adapted for that purpose, by inclosing the operating mechanism in a light-tight box and substituting camera lenses for those used in projecting pictures.

The method of using color screens for the production of colored moving pictures is in producing the film as well as in projecting the picture upon the screen, identical to that at present employed in the operation of the camera ordinarily employed in color photography, and will be readily understood by those versed in the art to which our invention appertains.

Having described the instrument used in practising our new method of producing motion pictures, in the best form at present known to us, we desire it understood that variations in the construction and arrangement of its parts may be resorted to within the spirit of our invention, that for example, two coöperative shutters may be employed in lieu of the simple rotary shutter herein described, that as mentioned hereinbefore more than two lenses and correspondingly different feed- and shutter-mechanism may be used to produce motion pictures by our improved method, and that a feeding mechanism of different construction may be devised to alternately feed the film-sections a predetermined distance while the respective lenses are covered by the shutter.

What we claim and desire to secure by Letters-Patent is:

1. An instrument for the production of motion-pictures comprising a flexible plate mounted at a point between its extremities, to flex at opposite sides thereof, lenses mounted on said plate at opposite sides of said point, means for flexing the plate at opposite sides of said point whereby to vary the angle of convergence of said lenses, a shutter-element operating to cover said lenses alternately during determinate periods, and mechanism for movably mounting film-sections in register with the openings of said lenses, including elements for alternately feeding said sections a determinate distance while the respective lenses are covered by the shutter-element.

2. An instrument for the production of motion pictures comprising a flexible plate mounted at a point between its extremities to flex at opposite sides thereof, lenses mounted on said plate at opposite sides of said point, means for flexing the plate at opposite sides of said point, whereby to vary the angle of convergence of said lenses, a shutter-element operating to cover said lenses alternately during determinate periods, and mechanism for movably mounting film-sections in register with the openings of said lenses, including elements for holding the film-sections upon the plate, to move conjointly therewith, and elements for alternately feeding said sections a determinate distance while the respective lenses are covered by the shutter-element.

3. An instrument for the production of motion-pictures comprising a flexible plate mounted at a point between its extremities to flex at opposite sides thereof, lenses mounted on said plate at opposite sides of said point, means for flexing the plate at opposite sides of said point whereby to vary the angle of convergence of said lenses, a shutter-element operating to cover said lenses alternately during determinate periods, and mechanism for movably mounting film-sections in register with the openings of said lenses, including elements mounted upon the plate in yielding contact with the film-sections whereby the latter are compelled to move conjointly with the plate, and elements for alternately feeding said sections a determinate distance while the respective lenses are covered by the shutter-element.

4. An instrument for the production of motion-pictures comprising a flexible plate mounted at a point between its extremities to flex at opposite sides thereof, lenses mounted on said plate at opposite sides of said point, means for flexing the plate at opposite sides of said point, whereby to vary the angle of convergence of said lenses, a shutter-element operating to cover said lenses alternately during determinate periods, and mechanism for movably mounting film-sections in register with the openings of said lenses, including frames hinged upon the plate to register with the lens-openings, springs on said frame to engage the longitudinal edges of the film-sections, and elements for alternately feeding said sections a determinate distance while the respective lenses are covered by the shutter-element.

5. An instrument for the production of motion-pictures comprising a flexible plate mounted at a point between its extremities to flex at opposite sides thereof, lenses mounted on said plate at opposite sides of said point, means for flexing the plate at opposite sides of said point whereby to vary the angle of convergence of said lenses, a shutter-element operating to cover said lenses alternately during determinate periods, and mechanism for movably mounting film-sections in register with the openings of said lenses, including elements for alternately feeding said sections a determinate distance while the respective lenses are covered by the shutter-element, said feeding elements each comprising sprocket-wheels adapted to mesh with series of apertures along the edges of the film-sections, and means to impart an intermittent rotary movement to said sprocket-wheels, frames hinged upon the plate to register with the lens-openings, and springs on said frame to engage the longitudinal edges of the film-sections for holding them in contact with the plate and in engagement with the respective sprocket-wheels.

6. In an instrument for the production of motion pictures, a flexible member, a lens mounted thereon, and means for the adjustment of said lens to vary the direction of its axis, by movement of said member relative to a fixed point of support.

7. In an instrument for the production of motion pictures, a flexible member, lenses mounted thereon, and means for the adjustment of said lenses for the convergence of their axes to a selected angle, by movement of said member with relation to a fixed point of support between said lenses.

8. In an instrument for the production of motion - pictures, a flexible plate, lenses mounted thereon at opposite sides of a fixed point of support, and means for flexing said plate at either side of said point of support for the convergence of the axes of the lenses to a selected variable angle.

In testimony whereof we have affixed our signatures in the presence of two witnesses.

HARRY A. TOLLES.
GEORGE H. ERNSBARGER.

Witnesses for Harry A. Tolles:
 JOSEPHINE GROOMS,
 HELEN PERCIVAL.
Witnesses for George H. Ernsbarger:
 L. RHOADES,
 F. H. CUNO.